United States Patent
He

(10) Patent No.: US 9,854,572 B2
(45) Date of Patent: Dec. 26, 2017

(54) DATA TRANSMISSION METHOD AND APPARATUS, AND USER EQUIPMENT

(71) Applicant: HUAWEI TECHNOLOGIES CO., LTD., Shenzhen (CN)

(72) Inventor: Chuanfeng He, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 50 days.

(21) Appl. No.: 14/868,669

(22) Filed: Sep. 29, 2015

(65) Prior Publication Data

US 2016/0021645 A1 Jan. 21, 2016

Related U.S. Application Data

(63) Continuation of application No. PCT/CN2013/073667, filed on Apr. 2, 2013.

(51) Int. Cl.
*H04W 72/04* (2009.01)
*H04L 5/00* (2006.01)
(Continued)

(52) U.S. Cl.
CPC ......... *H04W 72/042* (2013.01); *H04J 3/1694* (2013.01); *H04J 13/16* (2013.01);
(Continued)

(58) Field of Classification Search
CPC ............. H04W 72/12; H04W 72/0446; H04W 72/042; H04L 5/0094; H04J 3/1694
See application file for complete search history.

(56) References Cited

U.S. PATENT DOCUMENTS

| 2007/0104150 A1* | 5/2007 | Fernandez-Corbaton ............ H04B 1/7107 370/335 |
| 2009/0103497 A1* | 4/2009 | Fernandez-Corbaton ............... H04B 1/707 370/335 |

(Continued)

FOREIGN PATENT DOCUMENTS

| CN | 101273551 | 9/2008 |
| CN | 102740468 | 10/2012 |

(Continued)

OTHER PUBLICATIONS

Extended European Search Report dated Feb. 24, 2016 in corresponding European Patent Application No. 13881072.6.
(Continued)

*Primary Examiner* — Redentor Pasia
(74) *Attorney, Agent, or Firm* — Staas & Halsey LLP

(57) ABSTRACT

The present invention discloses a data transmission method and apparatus, and a user equipment. The method includes: classifying, by using a transmission time interval TTI as a classification basis, TTIs on a carrier in a cell into a time division multiplexing TDM TTI and a code division multiplexing CDM TTI; and sending, to a user equipment UE, control information carrying a classified result, so as to instruct the UE to send uplink data according to the classified result and a data scheduling type of the UE in the TDM TTI or the CDM. By using the foregoing technical solution, a data transmission resource can be well saved and scheduling flexibility can be improved.

11 Claims, 5 Drawing Sheets

(51) Int. Cl.
*H04L 13/16* (2006.01)
*H04J 3/16* (2006.01)
*H04W 72/12* (2009.01)
*H04J 13/16* (2011.01)

(52) U.S. Cl.
CPC ....... *H04L 5/0094* (2013.01); *H04W 72/0446* (2013.01); *H04W 72/12* (2013.01); *H04J 2013/165* (2013.01)

(56) References Cited

U.S. PATENT DOCUMENTS

2012/0124263 A1* 5/2012 Zhou ................ H04W 72/0486 710/240
2017/0006591 A1 1/2017 Pani et al.

FOREIGN PATENT DOCUMENTS

| CN | 102932916 | 2/2013 |
| CN | 103210695 | 7/2013 |
| EP | 2077646 A1 | 7/2009 |
| EP | 2680651 A1 | 1/2014 |
| WO | WO2009082120 | 7/2009 |
| WO | 2011/137432 A1 | 11/2011 |

OTHER PUBLICATIONS

International Search Report dated Jan. 2, 2014 in corresponding international application PCT/CN2013/073667.

3$^{rd}$ *Generation Partnership Project; Technical Specification Group Radio Access Network; Medium Access Control (MAC) protocol specification (Release 11)*, 3GPP TS 25.321 V11.3.0, Dec. 2012, pp. 1-207.

3$^{rd}$ *Generation Partnership Project; Technical Specification Group Radio Access Network; Physical layer procedures (FDD) (Release 11)*; 3GPP TS 23.214 V11.5.0, Feb. 2013, pp. 1-127.

International Search Report, dated Jan. 2, 2014, in corresponding International Application No. PCT/CN2013/073667 (11 pp.).

Chinese Office Action dated Jul. 5, 2017 in Chinese Patent Application No. 201380000260.2.

* cited by examiner

DATA TRANSMISSION METHOD AND APPARATUS, AND USER EQUIPMENT

CROSS-REFERENCE TO RELATED APPLICATIONS

This application is a continuation of International Application No. PCT/CN2013/073667, filed on Apr. 2, 2013, which is hereby incorporated by reference in its entirety.

TECHNICAL FIELD

The present invention relates to the field of wireless communications technologies, and in particular, to a data transmission method and apparatus, and a user equipment.

BACKGROUND

With increasingly higher requirements imposed by various services on delays, technologies such as multicode transmission, a hybrid automatic repeat request (HARQ), and a wireless short frame whose transmission time interval (TTI) is 2 ms are used in High Speed Uplink Packet Access (HSUPA), so that a maximum throughput rate of uplink data in a single cell reaches 5.76 Mbit/s, which further enhances a data service bearer capability and spectrum utilization of a Wideband Code Division Multiple Access (WCDMA) uplink link. However, in an HSUPA system, although more 2 ms TTI uplink users and users with a higher uplink rate can increase a quantity of users in a cell and a throughput, interference within the cell is also increased.

The prior art provides a support that a time division multiplexing (TDM) scheduling mode may be used in an uplink link for data transmission. A network operator may classify a UE (UE) as a high speed data user equipment or a low speed data user equipment according to a data rate requirement of the user equipment. Data transmission in a TDM mode is that: TTIs of 2 ms TTI user equipments in an uplink link are aligned regularly according to a timeslot class, and then a base station may schedule, by using the TDM mode, high speed data users to perform data transmission at different time and separately occupy a transmission timeslot; and schedule low speed data users to a same transmission timeslot by using a code division multiplexing (CDM) method, thereby avoiding interference between a high speed data user and a low speed data user that are in a same transmission timeslot in a CDM mode. In specific implementation, a network side device sends a scheduling grant command to a UE, to instruct the UE to occupy a transmission timeslot to transmit uplink data. The grant command includes an absolute grant (AG) and a relative grant (RG). The network side device, for example, a base station (Node B), sends control information to the UE through an enhanced dedicated channel absolute grant channel (E-AGCH), where the the control information carries an AG and identification information of the UE; and sends an RG to the UE through an enhanced dedicated channel relative grant channel (E-RGCH). The AG includes an absolute grant value and an absolute grant range. On a terminal side, the UE obtains, from the received control information that is sent by the Node B through the E-AGCH, an absolute grant value and an absolute grant range that are carried in the control information; adjusts, according to the obtained absolute grant value and absolute grant range, a service grant (SG, Scheduling Grant) maintained by the UE; and transmits uplink data in a corresponding transmission timeslot according to an adjustment result. For example, when the obtained absolute grant range is "Per HARQ process", in a valid transmission timeslot on the E-AGCH, an SG is updated to an AG indicated by the absolute grant value; and when the absolute grant range is "All HARQ processes", in all transmission timeslots after the valid transmission timeslot on the E-AGCH, SGs are updated to AGs indicated by the absolute grant value.

However, because the E-AGCH is a common channel, and the channel further needs to carry a UE identifier used to instruct a UE corresponding to the carried identifier to receive control information, the E-AGCH can send, in one subframe, a scheduling grant command to only one UE. In a method, provided in the prior art, that a network side device sends a scheduling grant command to a UE to implement data transmission based on a time division multiplexing scheduling mode, a scheduling grant command needs to be sent to the UE frequently, so as to control whether a high speed data user can send data in a particular transmission timeslot.

To sum up, according to the data transmission method provided in the prior art, a resource is wasted and data transmission flexibly is poor.

SUMMARY

Embodiments of the present invention provide a data transmission method and apparatus, and a user equipment, which can better save a data transmission resource and improve data transmission flexibility.

According to a first aspect, the present invention provides a data transmission method, including: for any carrier, classifying, by using a transmission time interval as a classification basis, transmission time interval TTIs on the carrier into a time division multiplexing TDM TTI and a code division multiplexing CDM TTI; adding the classified result to control information and sending the control information to a user equipment UE; and receiving uplink data sent by the UE according to the classified result and a data scheduling type of the UE in the TDM TTI or the CDM TTI.

In a first possible implementation manner of the first aspect, the classified result includes: a common process number that is used to identify each TTI obtained by means of the classification, and a bit that is in a one-to-one correspondence with each common process number, where different bits are respectively used to identify the TDM TTI and the CDM TTI that are obtained by means of the classification.

In a first specific implementation manner of the first possible implementation manner of the first aspect, the common process number is used to identify a TTI, and the common process number is determined in the following manner: CURRENT_COMMON_HARQ_PROCESS_ID= [5*C-CFN+subframe number] mod HARQ_RTT, where CURRENT_COMMON_HARQ_PROCESS_ID is a common process number, C-CFN is a set common connection frame number, subframe number is a common subframe number that is subordinated to a common connection frame and is used to identify a different TTI, HARQ_RTT is a hybrid automatic repeat round trip time, and mod is a modulo operation.

In a first specific implementation manner of the first possible implementation manner of the first aspect, the set common connection frame number C-CFN meets at least one of the following conditions: there is no frame offset between the C-CFN and a system frame number; or there is a common frame offset between the C-CFN and a system frame number.

In a second possible implementation manner of the first aspect, the method further includes: receiving the uplink data sent by the UE according to the classified result and the data scheduling type of the UE in the TDM TTI or the CDM TTI.

In a first specific implementation manner of the second possible implementation manner of the first aspect, before the receiving the uplink data that is sent by the UE in the TDM TTI or the CDM TTI, the method further includes: determining a data scheduling type of the UE, and sending the determined data scheduling type to the UE, so as to instruct the UE to determine the data scheduling type of the UE according to the sent data scheduling type.

In a second specific implementation manner of the second possible implementation manner of the first aspect, the determining a data scheduling type of the UE includes: determining the data scheduling type of the UE according to a type of data carried by the UE; or determining the data scheduling type of the UE according to a size, which is reported by the UE, of transmission.

In a third specific implementation manner of the second possible implementation manner of the first aspect, the sending the determined data scheduling type to the UE includes: adding the determined data scheduling type to the control information and sending the control information to the UE through a downlink physical channel; or adding the determined data scheduling type to the control information and sending the control information to the UE by using a system message or radio resource control RRC signaling.

In a fourth specific implementation manner of the second possible implementation manner of the first aspect, the determined data scheduling type is sent to the UE through the downlink physical channel in at least one of the following manners: adding the determined data scheduling type to absolute grant value information, and sending the absolute grant value information to the UE through an enhanced dedicated channel absolute grant channel; adding the determined data scheduling type to the control information sent on the enhanced dedicated channel absolute grant channel, and after performing masking on a cyclic redundancy check code of the control information in a set manner, sending the control information to the UE through the enhanced dedicated channel absolute grant channel; and adding the determined data scheduling type to the control information sent on the enhanced dedicated channel absolute grant channel, and sending the control information to the UE through the enhanced dedicated channel absolute grant channel by using a set cyclic redundancy check code.

In a fifth specific implementation manner of the second possible implementation manner of the first aspect, the determining the data scheduling type of the UE according to a size, which is reported by the UE, of data transmitted by the UE includes: determining whether the size, which is reported by the UE, of the data transmitted by the UE is less than or equal to a preset data size threshold, and determining the data scheduling type of the UE according to a determining result.

In a third possible implementation manner of the first aspect, after the adding a classified result to control information and sending the control information to a UE, the method further includes: sending, to the UE, a grant command that is valid when the data scheduling type of the UE is the same as a TTI data scheduling type, where the TTI data scheduling type includes the TDM TTI and the CDM TTI, so as to instruct the UE to send the uplink data according to the grant command, the classified result, and the data scheduling type of the UE in the TDM TTI or the CDM TTI.

In a fourth possible implementation manner of the first aspect, after the adding the classified result to control information and sending the control information to a UE, the method further includes: sending, to the UE, grant control information carrying indication information that is used to indicate whether the UE can transmit the uplink data in the CDM TTI or the TDM TTI, so as to instruct the UE to send the uplink data according to the grant control information, the classified result, and the data scheduling type of the UE in the TDM TTI or the CDM TTI.

According to a second aspect, the present invention provides a data transmission apparatus, including: a classification unit, configured to classify, by using a transmission time interval TTI as a classification basis, TTIs on a carrier in a cell into a time division multiplexing TDM TTI and a code division multiplexing CDM TTI, and send the classified result to a sending unit; and the sending unit, configured to send, to a user equipment UE, control information that carries the classified result sent by the sending unit, so as to instruct the UE to send uplink data according to the classified result and a data scheduling type of the UE in the TDM TTI or the CDM.

In a first possible implementation manner of the second aspect, the classified result obtained by the classification unit by means of the classification includes: a common process number that is used to identify each TTI obtained by means of the classification, and a bit that is in a one-to-one correspondence with each common progress number, where different bits are respectively used to identify the TDM TTI and the CDM TTI that are obtained by means of the classification.

In a first specific implementation manner of the first possible implementation manner of the second aspect, the classification unit determines, in the following manner, the common process number that is used to identify each TTI obtained by means of the classification: CURRENT_COMMON_HARQ_PROCESS_ID=[5*C-CFN+subframe number] mod HARQ_RTT, where CURRENT_COMMON_HARQ_PROCESS_ID is a common process number, C-CFN is a set common connection frame number, subframe number is a common subframe number that is subordinated to a common connection frame and is used to identify a different TTI, HARQ_RTT is a hybrid automatic repeat round trip time, and mod is a modulo operation.

In a second possible implementation manner of the second aspect, the apparatus further includes a determining unit, configured to determine a data scheduling type of the UE; and the sending unit is further configured to send the data scheduling type determined by the determining unit to the UE, so as to instruct the UE to determine the data scheduling type of the UE according to the sent data scheduling type.

In a third possible implementation manner of the second aspect, the apparatus further includes: a receiving unit, configured to receive the uplink data that is sent by the UE according to the classified result and the data scheduling type of the UE in the TDM TTI or the CDM TTI.

In a first specific implementation manner of the third possible implementation manner of the second aspect, the determining unit is further configured to determine the data scheduling type of the UE according to a type of data carried by the UE; or determine the data scheduling type of the UE according to a size, which is reported by the UE, of data transmitted by the UE.

In a second specific implementation manner of the third possible implementation manner of the second aspect, the determining unit is specifically configured to determine whether the size, which is reported by the UE, of the data transmitted by the UE is less than or equal to a preset data size threshold, and determine the data scheduling type of the UE according to a determining result.

In a fourth possible implementation manner of the second aspect, the sending unit is further configured to send, to the UE, a grant command that is valid when the data scheduling type of the UE is the same as a TTI data scheduling type, where the TTI data scheduling type includes the TDM TTI and the CDM TTI, so as to instruct the UE to send the uplink data according to the grant command, the classified result, and the data scheduling type of the UE in the TDM TTI or the CDM TTI.

In a fifth possible implementation manner of the second aspect, the sending unit is further configured to send, to the UE, grant control information carrying indication information that is used to indicate whether the UE can transmit the uplink data in the CDM TTI or the TDM TTI, so as to instruct the UE to send the uplink data according to the grant command, the classified result, and the data scheduling type of the UE in the TDM TTI or the CDM TTI.

According to a third aspect, the present invention provides a data transmission apparatus, including: a signal processor, configured to classify, by using a transmission time interval TTI as a classification basis, TTIs on a carrier in a cell into a time division multiplexing TDM TTI and a code division multiplexing CDM TTI; and a transceiver, configured to send, to a user equipment UE, control information carrying the classified result, so as to instruct the UE to send uplink data according to the classified result and a data scheduling type of the UE in the TDM TTI or the CDM.

According to a fourth aspect, the present invention provides a data transmission method, including: receiving, by a user equipment UE, control information that carries a classified result and is sent by a network side device, where the classified result is a result that the network side device classifies, by using a transmission time interval TTI as a classification basis, TTIs on a carrier in a cell into a time division multiplexing TDM TTI and a code division multiplexing CDM TTI; and sending uplink data according to the classified result carried in the control information and a data scheduling type of the UE in the TDM TTI or the CDM TTI.

In a first possible implementation manner of the fourth aspect, the classified result includes: a common process number that is used to identify each TTI obtained by means of the classification, and a bit that is in a one-to-one correspondence with each common process number, where different bits are respectively used to identify the TDM TTI and the CDM TTI that are obtained by means of the classification.

In a first specific implementation manner of the first possible implementation manner of the fourth aspect, the common process number that is used to identify each TTI obtained by means of the classification is determined in the following manner: CURRENT_COMMON_HARQ_PROCESS_ID=[5*C-CFN+subframe number] mod HARQ_RTT, where CURRENT_COMMON_HARQ_PROCESS_ID is a common process number, C-CFN is a set common connection frame number, subframe number is a common subframe number that is subordinated to a common connection frame and is used to identify a different TTI, HARQ_RTT is a hybrid automatic repeat round trip time, and mod is a modulo operation.

In a second specific implementation manner of the first possible implementation manner of the fourth aspect, the set common connection frame number C-CFN meets at least one of the following conditions: there is no frame offset between the C-CFN and a system frame number; or there is a common frame offset between the C-CFN and a system frame number.

In a second possible implementation manner of the fourth aspect, before the sending, by the UE, uplink data in the TDM TTI or the CDM TTI, the method further includes: determining, by the UE, the data scheduling type of the UE according to a received and determined data scheduling type of the UE that is sent by the network side device.

In a third possible implementation manner of the fourth aspect, before the sending, by the UE, uplink data in the TDM TTI or the CDM TTI, the method further includes: determining whether a size of data transmitted by the UE to the network side device is less than or equal to a preset data size threshold, and determining the data scheduling type of the UE according to a determining result.

In a fourth possible implementation manner of the fourth aspect, before the sending, by the UE, uplink data in the TDM TTI or the CDM TTI, and after the receiving control information that carries the classified result and is sent by a network side device, the method further includes: receiving, by the UE, a grant command that is valid when the data scheduling type of the UE is the same as a TTI data scheduling type, where the grand command is sent by the network side device, and the TTI data scheduling type includes the TDM TTI and the CDM TTI; and the sending, by the UE, uplink data according to the classified result carried in the control information and a data scheduling type of the UE in the TDM TTI or the CDM TTI includes: sending, by the UE when the data scheduling type of the UE is the same as the TTI data scheduling type, the uplink data according to the received grant command in the TDM TTI or the CDM TTI.

In a fifth possible implementation manner of the fourth aspect, after the receiving control information that carries the classified result and is sent by a network side device, the method further includes: receiving grant control information that carries indication information that is used to indicate whether the UE can transmit the uplink data in the CDM TTI or the TDM TTI, where the grant control information is sent by the network side device; and the sending, by the UE, uplink data according to the classified result carried in the control information and a data scheduling type of the UE in the TDM TTI or the CDM TTI includes: sending, by the UE when the data scheduling type of the UE is the same as the TTI data scheduling type and the grant control information allows the UE to send the uplink data, the uplink data according to the received grant control information in the TDM TTI or the CDM TTI.

According to a fifth aspect, the present invention provides a data transmission apparatus, including: a receiving unit, configured to receive control information that carries a classified result and is sent by a network side device, and transmit the control information to a sending unit, where the classified result is a result that the network side device classifies, by using a transmission time interval TTI as a classification basis, TTIs on a carrier in a cell into a time division multiplexing TDM TTI and a code division multiplexing CDM TTI; and the sending unit, configured to send uplink data according to the classified result carried in the control information and a data scheduling type of the UE in the TDM TTI or the CDM TTI, where the control information is sent by the receiving unit.

In a first possible implementation manner of the fifth aspect, the classified result received by the receiving unit includes: a common process number that is used to identify each TTI obtained by means of the classification, and a bit that is in a one-to-one correspondence with each common process number, where different bits are respectively used to identify the TDM TTI and the CDM TTI that are obtained by means of the classification.

In a first specific implementation manner of the first possible implementation manner of the fifth aspect, the common process number that is used to identify each TTI obtained by means of the classification and is received by the receiving unit is determined in the following manner: CURRENT_COMMON_HARQ_PROCESS_ID=[5*C-CFN+ subframe number] mod HARQ_RTT, where CURRENT_COMMON_HARQ_PROCESS_ID is a common process number, C-CFN is a set common connection frame number, subframe number is a common subframe number that is subordinated to a common connection frame and is used to identify a different TTI, HARQ_RTT is a hybrid automatic repeat round trip time, and mod is a modulo operation.

In a second possible implementation manner of the fifth aspect, the receiving unit is further configured to receive a determined data scheduling type of the UE that is sent by the network side device; and the sending unit is specifically configured to send the uplink data according to the classified result carried in the control information and the data scheduling type of the UE in the TDM TTI or the CDM TTI, where the control information is sent by the receiving unit and the data scheduling type of the UE is received by the receiving unit.

In a third possible implementation manner of the fifth aspect, the apparatus further includes a determining unit, configured to determine whether a size of data transmitted by the UE to the network side device is less than or equal to a preset data size threshold, and determine the data scheduling type of the UE according to a determining result.

In a fourth possible implementation manner of the fifth aspect, the receiving unit is further configured to receive a grant command that is valid when the data scheduling type of the UE is the same as a TTI data scheduling type, where the grant command is sent by the network side device, and the TTI data scheduling type includes the TDM TTI and the CDM TTI; and the sending unit is specifically configured to send, when the data scheduling type of the UE is the same as the TTI data scheduling type, the uplink data according to the received grant command in the TDM TTI or the CDM TTI.

In a fifth possible implementation manner of the fifth aspect, the receiving unit is further configured to receive grant control information that carries indication information that is used to indicate whether the UE can transmit the uplink data in the CDM TTI or the TDM TTI, where the grant control information is sent by the network side device; and the sending unit is specifically configured to send, when the data scheduling type of the UE is the same as a TTI data scheduling type and the grant control information allows the UE to send the uplink data, the uplink data according to the received grant control information in the TDM TTI or the CDM TTI.

According to a sixth aspect, the present invention provides a user equipment, including: a transceiver, configured to receive control information that carries the classified result and is sent by a network side device, where the classified result is a result that the network side device classifies, by using a transmission time interval TTI as a classification basis, TTIs on a carrier in a cell into a time division multiplexing TDM TTI and a code division multiplexing CDM TTI; and receive the classified result and a data scheduling type of the user equipment that are determined by a signal processor, and send uplink data in the TDM TTI or the CDM TTI; and the signal processor, configured to determine, according to the control information sent by the transceiver, the classified result carried in the control information and the data scheduling type of the user equipment.

The present invention has the following beneficial effects:

In the embodiments of the present invention, for any carrier, TTIs on the carrier are classified into a TDM TTI and a CDM TTI by using a TTI as a classification basis; the classified result is added to control information and the control information is sent to a UE; and the UE receives the control information carrying the classified result, and sends uplink data according to the classified result and a data scheduling type of the UE in the TDM TTI or the CDM TTI. Compared with the prior art, in the technical solution provided herein by the present invention, a TDM TTI and a CDM TTI are obtained by means of classification from a carrier based on a TTI, and a classified result is notified to a UE, so that a transmission resource does not need to be frequently occupied to send scheduling information to the UE, thereby well saving a transmission resource of a system and improving effectiveness of data transmission.

DESCRIPTION OF EMBODIMENTS

For the problem existing in the prior art that when an indoor distributed system that uses a repeater as a relay lacks a clock source, the data transmission method provided in the prior art causes a resource waste and poor effectiveness of data transmission, embodiments of the present invention herein provide a technical solution in which TTIs on a carrier in a cell are classified into a TDM TTI and a CDM TTI by using a TTI as a classification basis, and a classified result is notified to a UE, to instruct the UE to send uplink data according to the classified result and a data scheduling type of the UE in the TDM TTI or the CDM TTI, which can well save a data transmission resource, and improve flexibility of data transmission.

With reference to the accompanying drawings, key implementation principles, specific implementation manners, and beneficial effects of the technical solution in the embodiments of the present invention are described in detail in the following.

Embodiment 1

Figure 1A:
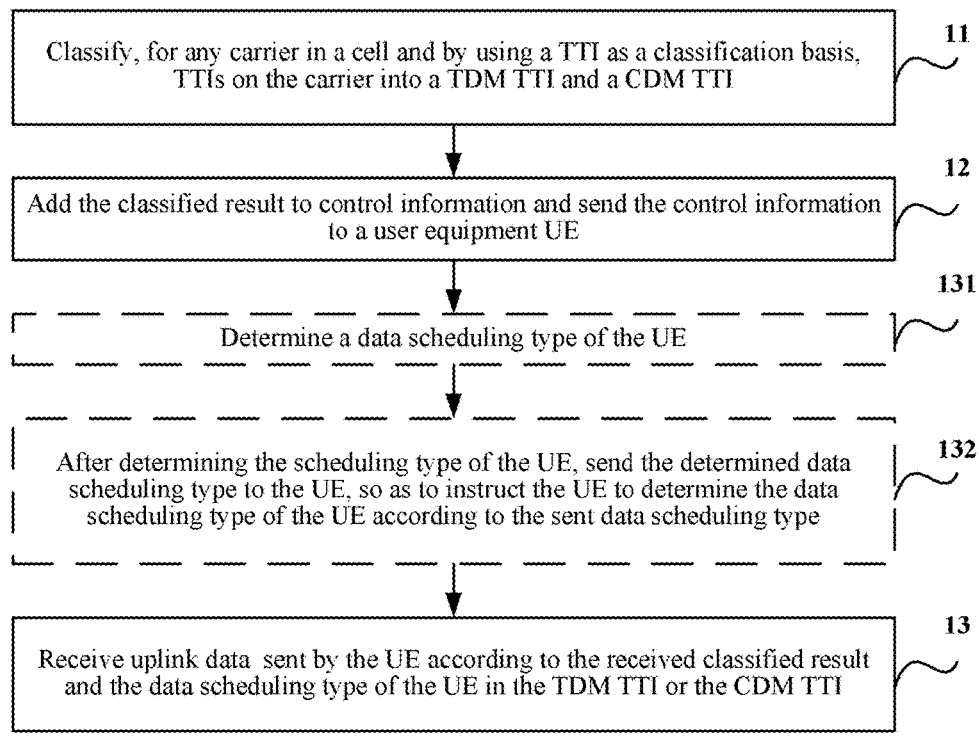
FIG. 1a is a flowchart of a data transmission method according to Embodiment 1 of the present invention.

Embodiment 1 of the present invention provides a data transmission method herein. As shown in FIG. 1a, a specific processing process of the method is described as follows:

Step 11: Classify, by using a TTI as a classification basis, TTIs on a carrier in a cell into a TDM TTI and a CDM TTI.

In a communications system, a base station, an evolved NodeB, a radio network controller, and the like are mainly disposed on a network side. A range of a carrier transmitted by a base station covers at least one cell, and the base station may transmit multiple carriers. In other words, one cell may be covered by multiple carriers. For ease of description, in the technical solution provided in Embodiment 1 of the present invention herein, detailed description is given by using one of the carriers that cover one cell as an example. Optionally, one of the carriers in the cell may be any carrier in the cell.

In an uplink transmission link of the carrier, TTIs on the carrier are classified into a TDM TTI and a CDM TTI by using a TTI as a classification basis. Specifically, TDM and CDM are different scheduling manners. Each TTI scheduling manner of the carrier is stipulated. Embodiment 1 of the present invention is elaborated herein by using an example that one carrier includes 8 TTIs. The 8 TTIs may be classified, TTI 0 to TTI 3 may be classified as TDM TTIs, and TTI 4 to TTI 7 may be classified as CDM TTIs. Certainly, there may be other various combinations of classification manners. For example, the 8 TTIs are classified alternately, that is, TTI 0 is a TDM TTI, TTI 1 is a CDM TTI, and TTI 2 is a TDM TTI. In a specific implementation, classification may be performed according to a data scheduling type of a UE included in a cell, and if a cell includes many high speed data UEs, when classification is performed, more TDM TTIs may be obtained by means of the classification to meet a requirement of data transmission.

Step 12: Send, to a user equipment UE, control information carrying the classified result, so as to instruct the UE to send uplink data according to the classified result and a data scheduling type of the UE in the TDM TTI or the CDM.

The classified result may include a common process number that is used to identify each TTI obtained by means of the classification, and a bit that is in a one-to-one correspondence with each common progress number, where different bits are respectively used to identify the TDM TTI and the CDM TTI that are obtained by means of the classification.

Figure 1B:
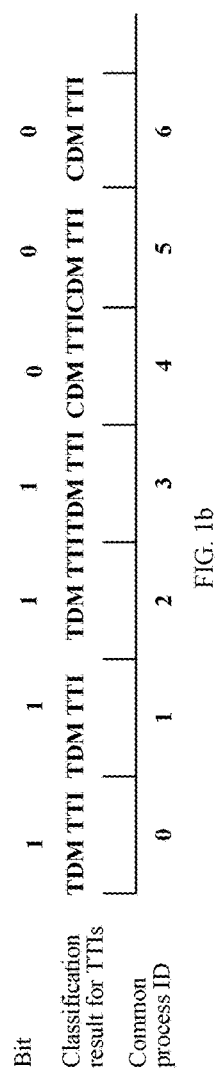
FIG. 1b is a schematic diagram of a correspondence between a common process number and a classified result for each TTI according to Embodiment 1 of the present invention.

In step 12, a detailed description is provided still by using an example that one carrier includes 8 TTIs. Bits of TDM TTIs and CDM TTIs that are obtained by means of classification may be identified by using binary data. As shown in FIG. 1b showing a schematic diagram of a correspondence between a common process number and a classified result for each TTI, for example, it is assumed that among the 8 TTIs, TTI 0 to TTI 3 are classified as TDM TTIs, and TTI 4 to TTI 7 are classified as CDM TTIs. Bits corresponding to the 8 TTIs are "11110000", that is, a binary numeral 1 is used to identify a TDM TTI, and a binary numeral 0 is used to identify a CDM TTI. Certainly, in specific implementation, the binary numeral 0 may be used to identify a TDM TTI, and the binary numeral 1 may be used to identify a CDM TTI. Certainly, there may be other various combinations of classification manners. For example, the 8 TTIs are classified alternately, that is, TTI 0 is a TDM TTI, TTI 1 is a CDM TTI, and TTI 2 is a TDM TTI.

In a TDM scheduling mode, data transmission is that: TTIs of 2 ms TTI UEs in an uplink link are aligned regularly according to a subframe level, and then a base station may schedule, by invoking each TTI, high speed data user equipments to perform data transmission at different time and separately occupy a TTI for data transmission; and may schedule low speed data user equipments to one TTI by using a CDM method, to perform data transmission. Although TTIs of 2 ms TTI UEs, in an uplink link, of UEs included in a cell are aligned regularly according to a subframe level, for a same TTI, different UEs have inconsistent understandings of a process number. Specifically, an analysis is as follows:

For a 2 ms TTI, an understanding of a UE on a process number corresponding to the current TTI may be indicated by using Formula 1 in the following:

CURRENT_HARQ_PROCESS_ID=[5*CFN+subframe number] mod HARQ_RTT     Formula 1, where CURRENT_HARQ_PROCESS_ID is the process number corresponding to the current TTI of the UE, CFN is a connection frame number, subframe number is a subframe number, HARQ_RTT is a hybrid automatic repeat round trip time, and mod is a modulo operation.

It can be learned from Formula 1 in the foregoing that the process number is related to the connection frame number (CFN, Connection Frame Number) of the UE, and there is a frame offset (Frame Offset) between the CFN of the UE and a system frame number (SFN, System Frame Number), and a specific relationship between the CFN and the SFN is shown in Formula 2 in the following:

CFN=(SFN−Frame Offset)mod 256     Formula 2, where

CFN is a connection frame number, Frame Offset is a frame offset, and SFN is a system frame number.

It can be learned from Formula 1 and Formula 2 in the foregoing that an SFN is common to different UEs, but because a different frame offset may be configured for each UE, CFNs of different UEs that correspond to one SFN are different. Therefore, a UE in a cell needs to know a common process number corresponding to each TTI.

Therefore, Embodiment 1 of the present invention herein provides a method for determining a common process number. Specifically, the common process number of each TTI obtained by means of the classification may be determined according to Formula 3 in the following:

CURRENT_COMMON_HARQ_PROCESS_ID=
[5*C-CFN+subframe number] mod HARQ_
RTT     Formula 3, where CURRENT_COMMON_HARQ_PROCESS_ID is a common process number, C-CFN is a set common connection frame number, subframe number is a common subframe number that is subordinate to a common connection frame and is used to identify a different TTI, HARQ_RTT is a hybrid automatic repeat round trip time, and mod is a modulo operation.

Specifically, the set common connection frame number meets at least one of the following conditions:

Condition 1: There is no frame offset between the C-CFN and a system frame number.

As shown in the Formula 3 in the foregoing, common process numbers No. 1 to No. 8 of CURRENT_COMMON_

HARQ_PROCESS_ID are in a one-to-one correspondence with bits that are sent by the base station by using an 8-bit bitmap. There may be no frame offset between a C-CFN and an SFN, that is:

C-CFN=SFN mod 256.

Condition 2: There is a common frame offset between the C-CFN and a system frame number.

A common frame offset: Common Frame Offset exists between the C-CFN and an SFN, and then a relationship between the C-CFN and the SFN is as follows:

C-CFN=(SFN−Common Frame Offset)mod 256.

Preferably, in addition to a frame offset, a code offset may further exist between a CFN of each UE and an SFN. Therefore, a boundary of the CFN is not aligned with that of the SFN, so that boundaries of CFNs of different UEs are not aligned, either. In the technical solution provided herein in Embodiment 1 of the present invention, because the C-CFN is defined as a common CFN, a frame boundary of the C-CFN also needs to be common for different UEs. For different UEs, after TTI-level alignment is configured, corresponding subframes are also aligned, and therefore, the frame boundary of the C-CFN may be defined as a subframe boundary after a frame boundary of the SFN. For example, a subframe boundary closest to the frame boundary of the SFN is used as the frame boundary of the C-CFN.

In the technical solution provided herein in this embodiment of the present invention, a common process number is defined, so that different UEs have a same understanding of a start number of a transmission timeslot included in a TTI of a same time.

Optionally, after step 12 in the foregoing, the method may further include:

Step 13: Receive uplink data that is sent by the UE according to the received classified result and the data scheduling type of the UE in the TDM TTI or the CDM TTI.

For example, for 8 TTIs on a carrier, the 8 TTIs are classified into TDM TTIs and CDM TTIs, and then a classified result for the 8 TTIs may be notified to the UE by carrying an 8-bit bitmap file on an E-AGCH or an HS-SCCH; or 8-bit information may be indicated by defining 8 signatures that are carried on an E-RGCH. For example, assuming that "1" indicates a TDM TTI and "0" indicates a CDM TTI, an 8-bit bitmap "11110000" means that: the first four TTIs are TDM TTIs and the last four TTIs are CDM TTIs. The 8-bit bitmap "11110000" may be sent to a UE in a cell through an E-RGCH.

Preferably, before step 13 in the foregoing, the method may further include the following steps:

Step 131: Determine a data scheduling type of the UE.

Specific implementation manners for determining the data scheduling type of the UE may include but are not limited to the following manners:

Manner 1: Determine the data scheduling type of the UE according to a type of data carried by the UE.

In specific implementation, a radio network controller disposed on a network side may be used to determine the data scheduling type of the UE according to the type of the data carried by the UE, and classify the UE as a TDM UE or a CDM UE.

Manner 2: Determine the data scheduling type of the UE according to a size, which is reported by the UE, of data transmitted by the UE.

It is determined whether the size, which is reported by the UE, of the data transmitted by the UE is less than or equal to a preset data size threshold, and the data scheduling type of the UE is determined according to a determining result. For example, a base station determines a data scheduling type of a UE according to a size of a buffer in SI reported by the UE. It is assumed that a preset data size threshold is M, and a size, which is reported by the UE, of data transmitted by the UE is N. When N is greater than M, the data scheduling type of the UE is a TDM data scheduling type, and when N is less than M, the data scheduling type of the UE is determined as a CDM data scheduling type. Classification of the data scheduling type of the UE may specifically vary with the preset data size threshold.

The data scheduling type of the UE that is determined in this manner may be notified to the UE, or may not be notified to the UE. When the preset data size threshold is known to both the UE and a network side device, the data scheduling type of the UE that is determined in Manner 2 in the foregoing may not be notified to the UE. When the UE does not know the preset data size threshold, after the data scheduling type of the UE is determined, a determining result needs to be notified to the UE.

Step 132: After determining the data scheduling type of the UE, send the determined data scheduling type to the UE, to instruct the UE to determine the data scheduling type of the UE according to the sent data scheduling type.

The determined data scheduling type may be sent to the UE through a downlink physical channel in at least one of the following manners:

Manner 1: The determined data scheduling type is added to absolute grant value information and the absolute grant value information is sent to the UE through an enhanced dedicated channel absolute grant channel. For example, 1-bit instruction information may be carried on an E-AGCH, to notify the UE of a data scheduling type of the UE.

Manner 2: The determined data scheduling type is added to control information sent on an enhanced dedicated channel absolute grant channel, and after masking is performed on a cyclic redundancy check code of the control information in a set manner, the control information is sent to the UE through the enhanced dedicated channel absolute grant channel.

Manner 3: The determined data scheduling type is added to control information sent on an enhanced dedicated channel absolute grant channel, and the control information is sent to the UE through the enhanced dedicated channel absolute grant channel by using a set cyclic redundancy check code.

Preferably, after step 12 in the foregoing, the method may further include:

sending, to the UE, a grant command that is valid when the data scheduling type of the UE is the same as a TTI data scheduling type, where the TTI data scheduling type includes the TDM TTI and the CDM TTI, so as to instruct the UE to send the uplink data according to the grant command, the classified result, and the data scheduling type of the UE in the TDM TTI or the CDM TTI.

In the foregoing step, the grant command may include an absolute grant command. The grant command is sent to the UE through the enhanced dedicated channel absolute grant channel to instruct the UE to determine, in service grant information maintained by the UE, a service grant value corresponding to the absolute grant command that is carried in the received grant command, and to send, when the service grant value is valid, that is, when the data scheduling type of the UE is the same as a TTI scheduling type, the uplink data in the TDM TTI or the CDM TTI.

For example, the base station may send an absolute grant command to the UE through the E-AGCH, and the absolute grant command sent through the E-AGCH may include content of the following two aspects:

1: An absolute grant value: 5 bits, which indicate a maximum power ratio of an E-DPDCH to an E-DPCCH, where the maximum power ratio is allowed to be used by UEs with sequence numbers ranging from 0 to 31 in an AG table; or deactivation; and 2: An absolute grant range: 1 bit, which is used to indicate an application range of the absolute grant value, that is, per HARQ process ("Per HARQ process") or all HARQ processes ("All HARQ processes").

An RG on an E-RGCH is sent by using 3, 12 or 15 consecutive transmission timeslots, in each transmission timeslot a sequence of 40 ternary values is transmitted, and ternary values separately indicate UP, HOLD and DOWN. Therefore, a single E-RGCH supports RG instructions of 40 uplink users to the maximum.

Specifically, the base station sends the absolute grant command to the UE through the E-AGCH. On the UE side, when receiving the absolute grant command sent by the base station, the UE acquires, according to the received absolute grant command and from SG information maintained by the UE, a service grant SG value corresponding to the absolute grant command, and determines, by means of comparision, whether the acquired SG value is the same as the data scheduling type of the UE; and if the acquired SG value is the same as the data scheduling type of the UE, the SG value is valid, and the UE sends the uplink data to the network side device in a corresponding TTI (that is, a TDM TTI or a CDM TTI that is the same as the data scheduling type of the UE). In specific implementation, for a UE having a TDM data scheduling type, the SG value is valid only in the TDM TTI. However, in the CDM TTI, the UE may be in a deactivated state by default, and the UE having a TDM data scheduling type does not send uplink data in the CDM TTI.

Preferably, after step 12 in the foregoing, the method may further include:

sending, to the UE, grant control information carrying indication information that is used to indicate whether the UE can transmit the uplink data in the CDM TTI or the TDM TTI, so as to instruct the UE to send the uplink data according to the grant control information, the classified result, and the data scheduling type of the UE in the TDM TTI or the CDM TTI.

In the foregoing step, the grant control information sent to the UE is used to indicate whether the UE can send the uplink data in the CDM TTI or the TDM TTI. In specific implementation, a signature may be allocated to each UE on an E-RGCH or an E-HICH, to indicate whether the UE can send the uplink data in a TTI, and an implementation manner for regular validation on the E-RGCH may be the same as that in the prior art, which is not described herein in Embodiment 1 of the present invention.

For a UE having a TDM data scheduling type, a base station may control whether the UE can send data in a different TDM TTI. In the prior art, a base station can only activate or deactivate a corresponding process of a UE through a common channel E-AGCH for implementation, the E-AGCH is shared among multiple UEs, only one UE can be instructed in a TTI on one channel, and if there are many UEs that need to be instructed, multiple E-AGCH channels need to be configured, which wastes a code resource; and if the number of UEs to be instructed is reduced, flexibility of TDM scheduling may be reduced. Compared with the foregoing problems in the prior art, the technical solution provided herein in Embodiment 1 of the present invention can effectively reduce occupation of an E-AGCH without reducing the number of UEs to be instructed, thereby improving flexibility of TDM scheduling and improving effectiveness of data transmission.

Embodiment 2

Figure 2:
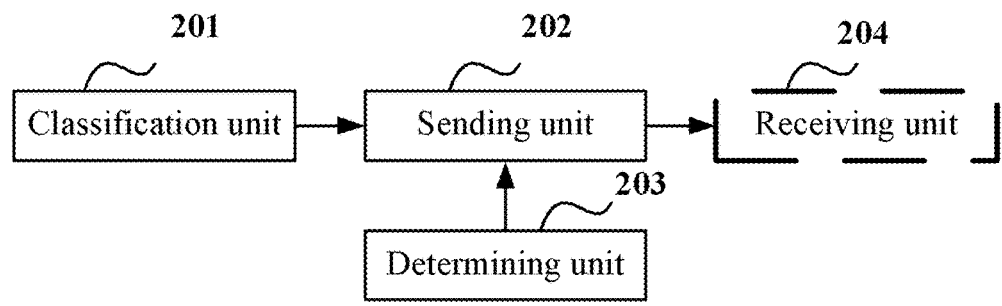
FIG. 2 is a schematic structural diagram of composition of a data transmission apparatus according to Embodiment 2 of the present invention.

Correspondingly, Embodiment 2 of the present invention provides a data transmission apparatus herein. As shown in FIG. 2, the data transmission apparatus includes:

A classification unit 201 is configured to classify, by using a transmission time interval TTI as a classification basis, TTIs on a carrier in a cell into a time division multiplexing TDM TTI and a code division multiplexing CDM TTI, and send the classified result to a sending unit 202.

Specifically, the classification unit 201 sends, to a user equipment UE, control information that carries the classified result and is sent by the classification unit, so as to instruct the UE to send uplink data according to the classified result and a data scheduling type of the UE in the TDM TTI or the CDM.

The classified result obtained by the classification unit 201 by means of the classification includes: a common process number that is used to identify each TTI obtained by means of the classification, and a bit that is in a one-to-one correspondence with each common progress number, where different bits are respectively used to identify the TDM TTI and the CDM TTI that are obtained by means of the classification.

Specifically, the classification unit 201 determines, in the following manner, the common process number of each TTI obtained by means of the classification:

$$CURRENT\_COMMON\_HARQ\_PROCESS\_ID = [5*C\text{-}CFN + \text{subframe number}] \bmod HARQ\_RTT,$$

where

CURRENT_COMMON_HARQ_PROCESS_ID is a common process number, C-CFN is a set common connection frame number, subframe number is a common subframe number that is subordinate to a common connection frame and is used to identify a different TTI, HARQ_RTT is a hybrid automatic repeat round trip time, and mod is a modulo operation.

Specifically, the common connection frame number C-CFN set by the classification unit 201 meets at least one of the following conditions: there is no frame offset between the C-CFN and a system frame number; or there is a common frame offset between the C-CFN and a system frame number.

The sending unit 202 is configured to send, to the user equipment UE, the control information that carries the classified result and is sent by the classification unit 201, so as to instruct the UE to send the uplink data according to the classified result and the data scheduling type of the UE in the TDM TTI or the CDM.

Preferably, the sending unit 202 is further configured to send, to the UE, a grant command that is valid when the data scheduling type of the UE is the same as a TTI data scheduling type, where the TTI data scheduling type includes the TDM TTI and the CDM TTI, so as to instruct the UE to send the uplink data according to the grant command, the classified result and the data scheduling type of the UE in the TDM TTI or the CDM TTI.

Preferably, the sending unit 202 is further configured to send, to the UE, grant control information carrying indication information that is used to indicate whether the UE can transmit the uplink data in the CDM TTI or the TDM TTI, so as to instruct the UE to send the uplink data according to the grant command, the classified result, and the data scheduling type of the UE in the TDM TTI or the CDM TTI.

The apparatus may further include:

a determining unit 203, configured to determine a data scheduling type of the UE, and send a determining result to the sending unit 202.

Specifically, the sending unit 202 is further configured to send the data scheduling type determined by the determining unit 203 to the UE, so as to instruct the UE to determine the data scheduling type of the UE according to the sent data scheduling type.

Specifically, the sending unit 202 is specifically configured to add the determined data scheduling type to control information and send the control information to the UE through a downlink physical channel; or add the determined data scheduling type to control information and send the control information to the UE by using a system message or radio resource control RRC signaling.

Specifically, the sending unit 202 is specifically configured to send the determined data scheduling type to the UE through the downlink physical channel in at least one of the following manners: adding the determined data scheduling type to absolute grant value information, and sending the absolute grant value information to the UE through an enhanced dedicated channel absolute grant channel; adding the determined data scheduling type to the control information sent on the enhanced dedicated channel absolute grant channel, and after masking is performed on a cyclic redundancy check code of the control information in a set manner, sending the control information to the UE through the enhanced dedicated channel absolute grant channel; and adding the determined data scheduling type to the control information sent on the enhanced dedicated channel absolute grant channel, and sending the control information to the UE through the enhanced dedicated channel absolute grant channel by using a set cyclic redundancy check code.

Specifically, the determining unit 203 is specifically configured to determine the data scheduling type of the UE according to a type of data carried by the UE; or determine the data scheduling type of the UE according to a size, which is reported by the UE, of data transmitted by the UE.

Specifically, the determining unit 203 is specifically configured to determine whether the size, which is reported by the UE, of the data transmitted by the UE is less than or equal to a preset data size threshold, and determine the data scheduling type of the UE according to a determining result.

Optionally, the foregoing apparatus further includes:

a receiving unit 204, configured to receive the uplink data that is sent by the UE according to the classified result and the data scheduling type of the UE in the TDM TTI or the CDM TTI.

Figure 3:
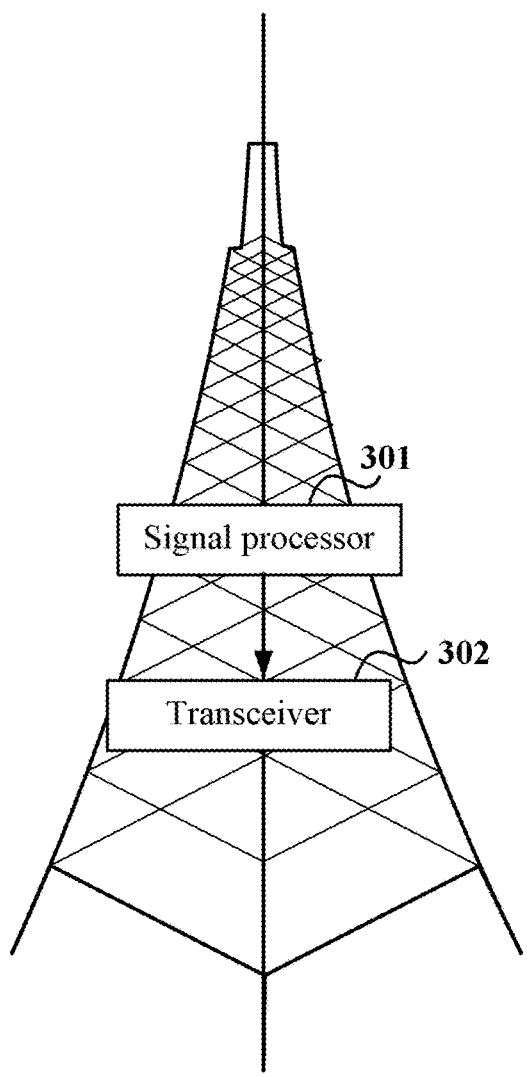
FIG. 3 is a schematic structural diagram of composition of a data transmission apparatus according to Embodiment 2 of the present invention.

Correspondingly, Embodiment 2 of the present invention further provides a data transmission apparatus herein. As shown in FIG. 3, the apparatus includes:

A signal processor 301 is configured to classify, by using a transmission time interval TTI as a classification basis, TTIs on a carrier in a cell into a time division multiplexing TDM TTI and a code division multiplexing CDM TTI; and send a classified result to a transceiver 302.

Specifically, the transceiver 302 sends, to a user equipment UE, control information that carries the classified result and is sent by the signal processor 301, so as to instruct the UE to send uplink data according to the classified result and a data scheduling type of the UE in the TDM TTI or the CDM.

The classified result obtained by the signal processor 301 by means of the classification includes: a common process number that is used to identify each TTI obtained by means of the classification, and a bit that is in a one-to-one correspondence with each common progress number, where different bits are respectively used to identify the TDM TTI and the CDM TTI that are obtained by means of the classification.

Specifically, the signal processor 301 determines, in the following manner, the common process number of each TTI obtained by means of the classification:

$$\text{CURRENT\_COMMON\_HARQ\_PROCESS\_ID} = [5*\text{C-CFN} + \text{subframe number}] \bmod \text{HARQ\_RTT},$$

where

CURRENT_COMMON_HARQ_PROCESS_ID is a common process number, C-CFN is a set common connection frame number, subframe number is a common subframe number that is subordinate to a common connection frame and is used to identify a different TTI, HARQ_RTT is a hybrid automatic repeat round trip time, and mod is a modulo operation.

Specifically, the common connection frame number C-CFN set by the signal processor 301 meets at least one of the following conditions: there is no frame offset between the C-CFN and a system frame number; or there is a common frame offset between the C-CFN and a system frame number.

The transceiver 302 is configured to send, to the user equipment UE, the control information that carries the classified result and is sent by the signal processor 301, so as to instruct the UE to send the uplink data according to the classified result and the data scheduling type of the UE in the TDM TTI or the CDM.

Preferably, the transceiver 302 is further configured to send, to the UE, a grant command that is valid when the data scheduling type of the UE is the same as a TTI data scheduling type, where the TTI data scheduling type includes the TDM TTI and the CDM TTI, so as to instruct the UE to send the uplink data according to the grant command, the classified result and the data scheduling type of the UE in the TDM TTI or the CDM TTI.

Preferably, the transceiver 302 is further configured to send, to the UE, grant control information carrying indication information that is used to indicate whether the UE can transmit the uplink data in the CDM TTI or the TDM TTI, so as to instruct the UE to send the uplink data according to the grant command, the classified result, and the data scheduling type of the UE in the TDM TTI or the CDM TTI.

The signal processor 301 is further configured to determine a data scheduling type of the UE, and transmit a determining result to the transceiver 302.

Specifically, the transceiver 302 is further configured to send the data scheduling type determined by the signal processor 301 to the UE, so as to instruct the UE to determine the data scheduling type of the UE according to the sent data scheduling type.

Specifically, the transceiver 302 is specifically configured to add the determined data scheduling type to control information and send the control information to the UE through a downlink physical channel; or add the determined data scheduling type to control information and send the control information to the UE by using a system message or radio resource control RRC signaling.

Specifically, the transceiver 302 is specifically configured to send the determined data scheduling type to the UE through the downlink physical channel in at least one of the following manners: adding the determined data scheduling type to absolute grant value information, and sending the absolute grant value information to the UE through an enhanced dedicated channel absolute grant channel; adding the determined data scheduling type to the control information sent on the enhanced dedicated channel absolute grant channel, and after masking is performed on a cyclic redundancy check code of the control information in a set manner, sending the control information to the UE through the enhanced dedicated channel absolute grant channel; and adding the determined data scheduling type to the control information sent on the enhanced dedicated channel absolute grant channel, and sending the control information to the UE through the enhanced dedicated channel absolute grant channel by using a set cyclic redundancy check code.

Specifically, the signal processor 301 is specifically configured to determine the data scheduling type of the UE according to a type of data carried by the UE; or determine the data scheduling type of the UE according to a size, which is reported by the UE, of data transmitted by the UE.

Specifically, the signal processor 301 is specifically configured to determine whether the size, which is reported by the UE, of the data transmitted by the UE is less than or equal to a preset data size threshold, and determine the data scheduling type of the UE according to a determining result.

The transceiver is further configured to receive the uplink data that is sent by the UE according to the classified result and the data scheduling type of the UE in the TDM TTI or the CDM TTI.

Embodiment 3

Figure 4:
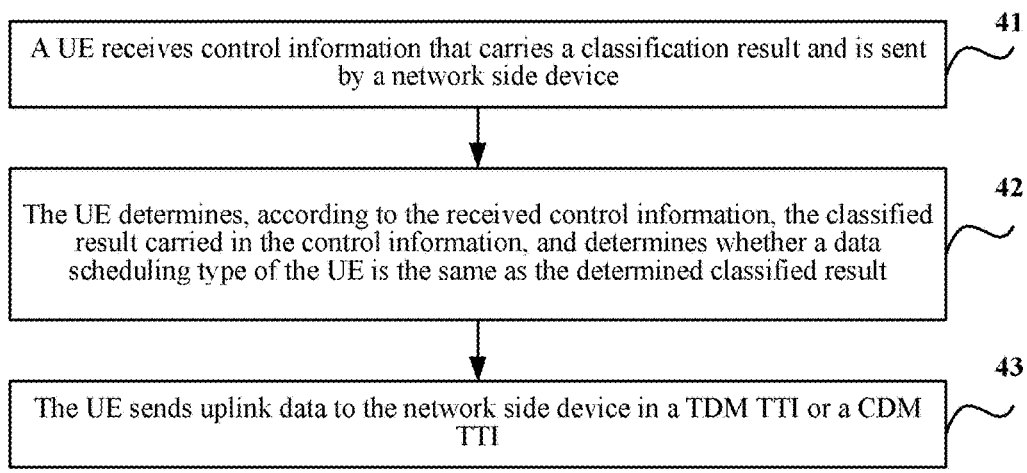
FIG. 4 is a flowchart of a data transmission method according to Embodiment 3 of the present invention.

Embodiment 3 of the present invention provides a data transmission method herein. As shown in FIG. 4, a specific processing process of the method is described as follows:

Step 41: A UE receives control information that carries a classified result and is sent by a network side device.

The received classified result is a result that the network side device classifies, by using a transmission time interval TTI as a classification basis, TTIs on a carrier in a cell into a time division multiplexing TDM TTI and a code division multiplexing CDM TTI.

In a communications system, a base station and a radio network controller are mainly disposed on a network side. A range of a carrier transmitted by a base station covers at least one cell, and one cell includes at least one UE, and the base station transmits multiple carriers. In other words, one cell may be covered by multiple carriers. For a specific implementation manner for classifying a TTI on the carrier as a TDM TTI or a CDM TTI, refer to the detailed description in step 11 in Embodiment 1 in the foregoing, which is not described herein again in Embodiment 3 of the present invention.

The classified result includes a common process number that is used to identify each TTI obtained by means of the classification, and a bit that is in a one-to-one correspondence with each common process number, where different bits are respectively used to identify the TDM TTI and the CDM TTI that are obtained by means of the classification.

A detailed description is provided by using an example that one carrier includes 8 TTIs. Bits of TDM TTIs and CDM TTIs that are obtained by means of classification may be identified by using binary data. For example, it is assumed that in the 8 TTIs, TTI 0 to TTI 3 are classified as TDM TTIs, and TTI 4 to TTI 7 are classified as CDM TTIs. Bits corresponding to the 8 TTIs are "11110000", that is, a binary numeral 1 is used to identify a TDM TTI, and a binary numeral 0 is used to identify a CDM TTI. Certainly, in specific implementation, the binary numeral 0 may be used to identify a TDM TTI, and the binary numeral 1 may be used to identify a CDM TTI. Certainly, there may be other various combinations of classification manners. For example, the 8 TTIs are classified alternately, that is, TTI 0 is a TDM TTI, TTI 1 is a CDM TTI, and TTI 2 is a TDM TTI.

In a TDM scheduling mode, data transmission is that: TTIs of 2 ms TTI UEs in an uplink link are aligned regularly according to a subframe level, and then a network side device (for example, a base station) may schedule, by invoking each TTI, high speed data user terminals to perform data transmission at different time and separately occupy a TTI for data transmission; and may schedule low speed data user terminals to one TTI by using a CDM method, to perform data transmission. Although TTIs of 2 ms TTI UEs, in an uplink link, of UEs included in a cell are aligned regularly according to a subframe level, for a same TTI, different UEs have inconsistent understandings of a process number.

Based on this, the common process number used to identify each TTI obtained by means of the classification is determined in the following manner:

$$\text{CURRENT\_COMMON\_HARQ\_PROCESS\_ID}=\\ [5*\text{C-CFN}+\text{subframe number}] \bmod \text{HARQ\_RTT},$$

where

CURRENT_COMMON_HARQ_PROCESS_ID is a common process number, C-CFN is a set common connection frame number, subframe number is a common subframe number that is subordinate to a common connection frame and is used to identify a different TTI, HARQ_RTT is a hybrid automatic repeat round trip time, and mod is a modulo operation.

The set common connection frame number C-CFN meets at least one of the following conditions:

Manner 1: There is no frame offset between the C-CFN and a system frame number, that is, C-CFN=SFN mod 256.

Manner 2: There is a common frame offset between the C-CFN and a system frame number, that is, C-CFN'(SFN−Common Frame Offset) mod 256, where Common Frame Offset is the common frame offset.

Preferably, in addition to a frame offset, a code offset may further exist between a CFN of each UE and an SFN. Therefore, a boundary of the CFN is not aligned with that of the SFN, so that boundaries of CFNs of different UEs are not aligned, either. In the technical solution provided herein in Embodiment 3 of the present invention, because the C-CFN is defined as a common CFN, a frame boundary of the C-CFN also needs to be common for different UEs. For different UEs, after TTI-level alignment is configured, corresponding subframes are also aligned, and therefore, the frame boundary of the C-CFN may be defined as a subframe boundary after a frame boundary of the SFN. For example, a subframe boundary closest to the frame boundary of the SFN is used as the frame boundary of the C-CFN.

Step 42: The UE determines, according to the received control information, the classified result carried in the control information, and determines whether a data scheduling type of the UE is the same as the determined classified result. If the data scheduling type of the UE is the same as the determined classified result, step 43 is performed; otherwise, the UE does not send uplink data in the TTI.

Manners for determining the data scheduling type of the UE by the UE may be but are not limited to the following two manners:

Manner 1: The UE determines the data scheduling type of the UE according to a received and determined data scheduling type of the UE that is sent by the network side device.

For a specific implementation manner for determining the data scheduling type of the UE by the network side device, refer to the detailed description in step 131 in Embodiment 1, which is not described herein again in Embodiment 3 of the present invention.

Manner 2: Determine whether a size of data transmitted by the UE to the network side device is less than or equal to a preset data size threshold, and determine the data scheduling type of the UE according to a determining result.

In the second implementation manner for determining the data scheduling type of the UE in step 131 in Embodiment 1 in the foregoing, the UE may determine the data scheduling type of the UE according to the size of the data transmitted by the UE. In this manner, the network side device does not need to give a notification, that is, for the network side device and the UE, when the data scheduling type of the UE is determined in Manner 2, a determining result is known to both the network side device and the UE. It is assumed that a preset data size threshold is M, and a size of data transmitted by the UE to the network side device is N. When N is greater than M, the data scheduling type of the UE is a TDM data scheduling type, and when N is less than M, the data scheduling type of the UE is determined as a CDM data scheduling type. Classification of the data scheduling type of the UE may specifically vary with the preset data size threshold. For the data scheduling type of the UE that is determined in this manner, when the preset data size threshold is known to both the UE and the network side device, the network side device does not need to notify the UE of the data scheduling type of the UE.

Step 43: The UE sends the uplink data to the network side device in the TDM TTI or the CDM TTI.

Preferably, after step 43 in the foregoing, the method may further include:

Step 1: The UE receives a grant command that is valid when the data scheduling type of the UE is the same as a TTI data scheduling type, where the grant command is sent by the network side device.

The TTI data scheduling type includes the TDM TTI and the CDM TTI.

Step 2: The UE sends, when the data scheduling type of the UE is the same as the TTI data scheduling type, the uplink data according to the received grant command in the TDM TTI or the CDM TTI.

In the foregoing step 1 to step 2, the grant command may include an absolute grant command. The grant command is sent to the UE through an enhanced dedicated channel absolute grant channel to instruct the UE to determine, in service grant information maintained by the UE, a service grant value corresponding to the absolute grant command that is carried in the received grant command, and to send, when the service grant value is valid, that is, when the data scheduling type of the UE is the same as the TTI data scheduling type, the uplink data in the TDM TTI or the CDM TTI.

Specifically, the base station sends the absolute grant command to the UE through an E-AGCH. On the UE side, when receiving the absolute grant command sent by the base station, the UE acquires, according to the received absolute grant command and from SG information maintained by the UE, a service grant SG value corresponding to the absolute grant command, and determines, by means of comparison, whether the acquired SG value is the same as the data scheduling type of the UE; and if the acquired SG value is the same as the data scheduling type of the UE, the SG value is valid, and the UE sends the uplink data to the network side device in a corresponding TTI (that is, a TDM TTI or a CDM TTI that is the same as the data scheduling type of the UE). In specific implementation, for a UE having a TDM data scheduling type, the SG value is valid only in the TDM TTI. However, in the CDM TTI, the UE may be in a deactivated state by default, and the UE having a TDM data scheduling type does not send uplink data in the CDM TTI.

Preferably, after step 43 in the foregoing, the method may further include:

Step 1': Receive grant control information that carries indication information that is used to indicate whether the UE can transmit the uplink data in the CDM TTI or the TDM TTI, where the grant control information is sent by the network side device.

Step 2': The UE sends, when the data scheduling type of the UE is the same as the TTI data scheduling type and the grant control information allows the UE to send the uplink data, the uplink data according to the received grant control information in the TDM TTI or the CDM TTI.

For a UE having a TDM data scheduling type, a base station may control whether the UE can send data in a different TDM TTI. In the prior art, a base station can only activate or deactivate a corresponding process of a UE through a common channel E-AGCH for implementation, the E-AGCH is shared among multiple UEs, only one UE can be instructed in a TTI on one channel, and if there are many UEs that need to be instructed, multiple E-AGCH channels need to be configured, which wastes a code resource; and if the number of UEs to be instructed is reduced, flexibility of TDM scheduling may be reduced. Compared with the foregoing problems in the prior art, the technical solution provided herein in Embodiment 1 of the present invention can effectively reduce occupation of an E-AGCH without reducing the number of UEs to be instructed, thereby improving flexibility of TDM scheduling and improving effectiveness of data transmission.

Embodiment 4

Figure 5:
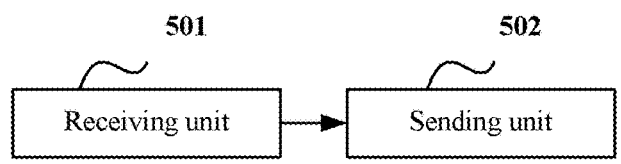
FIG. 5 is a schematic structural diagram of composition of a data transmission apparatus according to Embodiment 3 of the present invention.

Embodiment 4 of the present invention provides a data transmission apparatus herein. As shown in FIG. 5, the apparatus includes:

a receiving unit 501, configured to receive control information that carries a classified result and is sent by a network side device, and transmit the control information to a sending unit 502, where the classified result is a result that the network side device classifies, by using a transmission time interval TTI as a classification basis, TTIs on a carrier in a cell into a time division multiplexing TDM TTI and a code division multiplexing CDM TTI; and the sending unit 502, configured to send uplink data according to the classified result carried in the control information and a data scheduling type of the UE in the TDM TTI or the CDM TTI, where the control information is sent by the receiving unit 501.

Specifically, the classified result received by the receiving unit 501 includes: a common process number that is used to identify each TTI obtained by means of the classification, and a bit that is in a one-to-one correspondence with each common process number, where different bits are respectively used to identify the TDM TTI and the CDM TTI that are obtained by means of the classification.

Specifically, the common process number that is used to identify each TTI obtained by means of the classification and is received by the receiving unit 501 is determined in the following manner:

CURRENT_COMMON_HARQ_PROCESS_ID= [5*C-CFN+subframe number] mod HARQ_RTT, where

CURRENT_COMMON_HARQ_PROCESS_ID is a common process number, C-CFN is a set common connection frame number, subframe number is a common subframe number that is subordinate to a common connection frame and is used to identify a different TTI, HARQ_RTT is a hybrid automatic repeat round trip time, and mod is a modulo operation.

Specifically, the receiving unit 501 is further configured to receive a determined data scheduling type of the UE that is sent by the network side device; and the sending unit 502 is specifically configured to send the uplink data according to the classified result carried in the control information and the data scheduling type of the UE in the TDM TTI or the CDM TTI, where the control information is sent by the receiving unit and the data scheduling type of the UE is received by the receiving unit.

The apparatus further includes:

a determining unit, configured to determine whether a size of data transmitted by the UE to the network side device is less than or equal to a preset data size threshold, and determine the data scheduling type of the UE according to a determining result.

Specifically, the receiving unit 501 is further configured to receive a grant command that is valid when the data scheduling type of the UE is the same as a TTI data scheduling type, where the grant command is sent by the network side device, and the TTI data scheduling type includes the TDM TTI and the CDM TTI; and the sending unit 502 is specifically configured to send, when the data scheduling type of the UE is the same as the TTI data scheduling type, the uplink data according to the received grant command in the TDM TTI or the CDM TTI.

Specifically, the receiving unit 501 is further configured to receive grant control information that carries indication information that is used to indicate whether the UE can transmit the uplink data in the CDM TTI or the TDM TTI, where the grant control information is sent by the network side device; and the sending unit 502 is specifically configured to send, when the data scheduling type of the UE is the same as a TTI data scheduling type and the grant control information allows the UE to send the uplink data, the uplink data according to the received grant control information in the TDM TTI or the CDM TTI.

Figure 6:
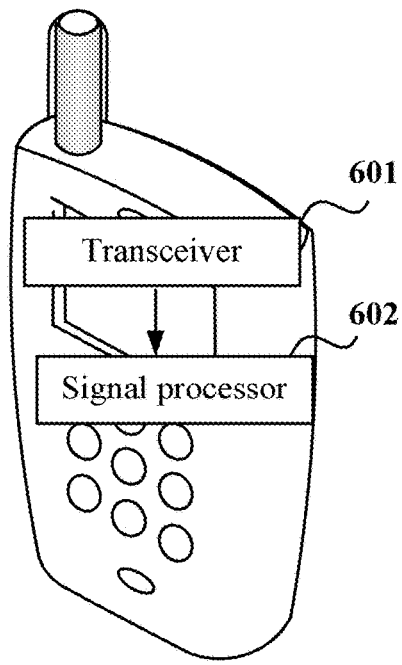
FIG. 6 is a schematic structural diagram of composition of a user equipment according to Embodiment 3 of the present invention.

Correspondingly, Embodiment 2 of the present invention further provides a user equipment herein. As shown in FIG. 6, the user equipment includes:

a transceiver 601, configured to receive control information that carries a classified result and is sent by a network side device, and transmit the control information to a signal processor 602, where the classified result is a result that the network side device classifies, by using a transmission time interval TTI as a classification basis, TTIs on a carrier in a cell into a time division multiplexing TDM TTI and a code division multiplexing CDM TTI; and the signal processor 602, configured to determine, according to the control information sent by the transceiver 601, the classified result carried in the control information and a data scheduling type of the user equipment.

Specifically, the classified result received by the transceiver 601 includes: a common process number that is used to identify each TTI obtained by means of the classification, and a bit that is in a one-to-one correspondence with each common process number, where different bits are respectively used to identify the TDM TTI and the CDM TTI that are obtained by means of the classification.

Specifically, the common process number that is used to identify each TTI obtained by means of the classification and is received by the transceiver 601 are determined in the following manner: further including:

CURRENT_COMMON_HARQ_PROCESS_ID= [5*C-CFN+subframe number] mod HARQ_RTT, where

CURRENT_COMMON_HARQ_PROCESS_ID is a common process number, C-CFN is a set common connection frame number, subframe number is a common subframe number that is subordinate to a common connection frame and is used to identify a different TTI, HARQ_RTT is a hybrid automatic repeat round trip time, and mod is a modulo operation.

Specifically, the transceiver 601 is further configured to receive a determined data scheduling type of the UE that is sent by the network side device; and the signal processor 602 is specifically configured to send the uplink data according to the classified result carried in the control information and the data scheduling type of the UE in the TDM TTI or the CDM TTI, where the control information is sent by the transceiver 601 and the data scheduling type of the UE is received by the transceiver.

The signal processor 602 is further configured to determine whether a size of data transmitted by the UE to the network side device is less than or equal to a preset data size threshold, and determine the data scheduling type of the UE according to a determining result.

Specifically, the transceiver 601 is further configured to receive a grant command that is valid when the data scheduling type of the UE is the same as a TTI data scheduling type, where the grant command is sent by the network side device, and the TTI data scheduling type includes the TDM TTI and the CDM TTI; and the signal processor 602 is specifically configured to send, when the data scheduling type of the UE is the same as the TTI data scheduling type, the uplink data according to the received grant command in the TDM TTI or the CDM TTI.

Specifically, the transceiver 601 is further configured to receive grant control information that carries indication information that is used to indicate whether the UE can transmit the uplink data in the CDM TTI or the TDM TTI, where the grant control information is sent by the network side device; and the signal processor 602 is specifically configured to send, when the data scheduling type of the UE is the same as a TTI data scheduling type and the grant control information allows the UE to send the uplink data, the uplink data according to the received grant control information in the TDM TTI or the CDM TTI.

Embodiment 5

Figure 7:
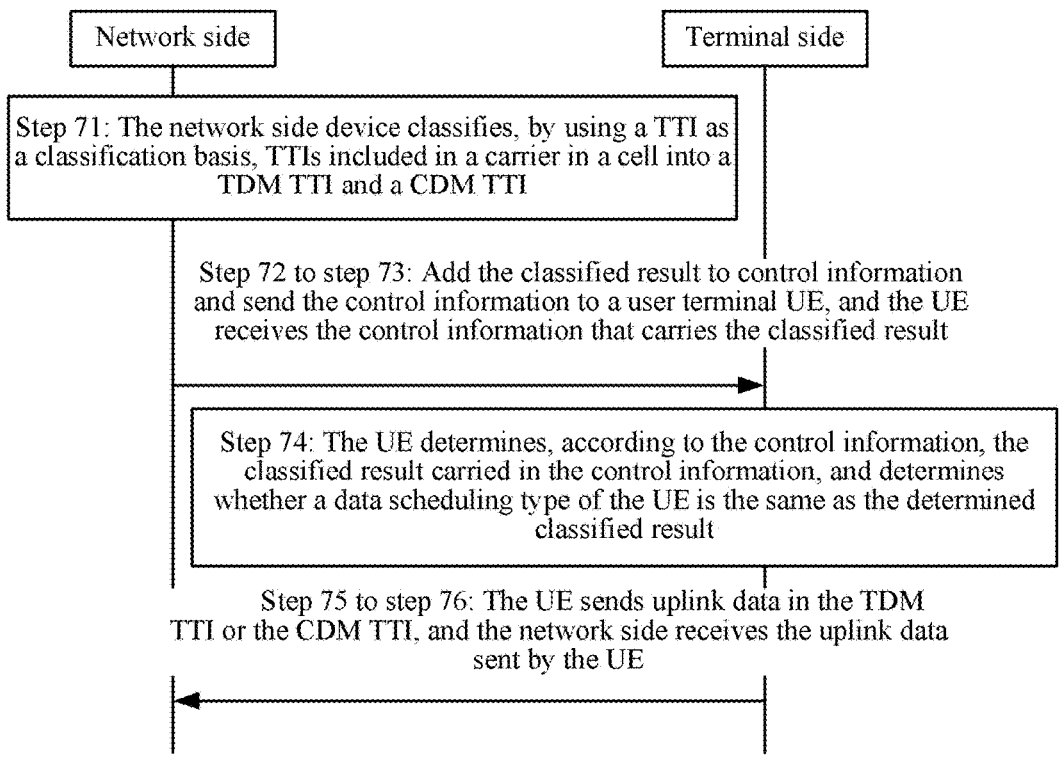
FIG. 7 is a flowchart of a data transmission method according to Embodiment 4 of the present invention.

Embodiment 5 of the present invention provides a data transmission method herein. As shown in FIG. 7, a specific processing process of the method is described as follows:

Step 71: A network side device classifies, by using a TTI as a classification basis, TTIs on a carrier in a cell into a TDM TTI and a CDM TTI.

Specifically, for a specific implementation manner for classifying different TTIs, refer to the detailed description in step 11 in Embodiment 1 in the foregoing, which is not described herein again in Embodiment 5 of the present invention.

Step 72: The network side device adds a classified result to control information and sends the control information to a UE.

A detailed description is provided by using an example that one carrier includes 8 TTIs. Bits of TDM TTIs and CDM TTIs that are obtained by means of classification may be identified by using binary data. As shown in FIG. 1b showing a schematic diagram of a correspondence between a common process number and a classified result for each TTI, for example, it is assumed that among the 8 TTIs, TTI 0 to TTI 3 are classified as TDM TTIs, and TTI 4 to TTI 7 are classified as CDM TTIs. Bits corresponding to the 8 TTIs are "11110000", that is, a binary numeral 1 is used to identify a TDM TTI, and a binary numeral 0 is used to identify a CDM TTI. Certainly, in specific implementation, the binary numeral 0 may be used to identify a TDM TTI, and the binary numeral 1 may be used to identify a CDM TTI. Certainly, there may be other various combinations of classification manners. For example, the 8 TTIs are classified alternately, that is, TTI 0 is a TDM TTI, TTI 1 is a CDM TTI, and TTI 2 is a TDM TTI. Specifically, an 8-bit bitmap "11110000" means that: the first four TTIs (0 to 3) are TDM TTIs and the last four TTIs (4 to 7) are CDM TTIs. The 8-bit bitmap "11110000" may be sent to a UE in a cell through an E-RGCH.

Preferably, a data scheduling type of the UE may further be determined by the network side device, and after determining the data scheduling type of the UE, the network side device sends the determined data scheduling type to the UE, so as to instruct the UE to determine the data scheduling type of the UE according to the sent data scheduling type.

Specifically, for a specific implementation manner for determining the data scheduling type of the UE, refer to the detailed description in Embodiment 1 in the foregoing, which is not described herein again in Embodiment 5 of the present invention.

Preferably, a grant command that is valid when the data scheduling type of the UE is the same as a TTI data scheduling type is sent to the UE, where the TTI data scheduling type includes the TDM TTI and the CDM TTI. Uplink data that is sent by the UE according to the grant command, the classified result and the data scheduling type of the UE in the TDM TTI or the CDM TTI is received.

Specifically, for a specific implementation manner for sending the grant command to the UE, refer to the detailed description in Embodiment 1 in the foregoing, which is not described herein again in Embodiment 5 of the present invention.

Preferably, grant control information carrying indication information that is used to indicate whether the UE can transmit the uplink data in the CDM TTI or the TDM TTI may be sent to the UE, and the uplink data that is sent by the UE according to the grant control information, the classified result, and the data scheduling type of the UE in the TDM TTI or the CDM TTI is received.

Specifically, for a specific implementation manner for sending the grant control information to the UE, refer to the detailed description in Embodiment 1 in the foregoing, which is not described herein again in Embodiment 5 of the present invention.

Step 73: The UE receives the control information that carries the classified result and is sent by the network side device.

The received classified result is a result that the network side device classifies, for any carrier and by using a transmission time interval as a classification basis, TTIs on the carrier into a TDM TTI and a CDM TTI.

Step 74: The UE determines, according to the control information, the classified result carried in the control information, and determines whether a data scheduling type of the UE is the same as the determined classified result. If the data scheduling type of the UE is the same as the determined classified result, step 75 is performed; otherwise, the UE does not send uplink data in the TTI.

For a specific implementation manner for determining the data scheduling type of the UE, refer to the detailed description in Embodiment 3 in the foregoing, which is not described herein again in Embodiment 5 of the present invention.

Step 75: The UE sends the uplink data in the TDM TTI or the CDM TTI.

Step 76: Receive the uplink data that is sent by the UE according to the received classified result and the data scheduling type of the UE in the TDM TTI or the CDM TTI.

By using the technical solution provided herein in this embodiment of the present invention, a network side device does not need to occupy a transmission resource to frequently send a scheduling grant command to a terminal side to notify a UE whether the UE can send uplink data in a transmission timeslot, thereby well saving a transmission resource of a system.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate a product that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, so as to generate computer-implemented processing. Therefore, the instructions executed on the computer or the another programmable device provide steps for implementing a specific function in one or more processes in the flowcharts and/or in one or more blocks in the block diagrams.

Although some exemplary embodiments of the present invention have been described, persons skilled in the art may make changes and modifications to these embodiments once they learn the basic inventive concept. Therefore, the following claims are intended to be construed as to cover the exemplary embodiments and all changes and modifications falling within the scope of the present invention.

Obviously, persons skilled in the art may make various modifications and variations to the present invention without departing from the spirit and scope of the present invention. The present invention is intended to cover these modifications and variations provided that they fall within the protection scope defined by the following claims and their equivalent technologies.

What is claimed is:

1. A data transmission method, comprising:
classifying, by using a transmission time interval (TTI) as a classification basis, TTIs on a carrier in a cell into a time division multiplexing (TDM) TTI and a code division multiplexing (CDM) TTI; and
sending, to a user equipment (UE) through an enhanced dedicated channel absolute grant channel, control information carrying the classified result, so as to instruct the UE to send uplink data according to the classified result and a data scheduling type of the UE in the TDM TTI or the CDM TTI,
wherein the classified result comprises a common process number that is used to identify each TTI obtained by means of the classification, and a bit that is in a one-to-one correspondence with each common process number,
wherein different bits are respectively used to identify the TDM TTI and the CDM TTI that are obtained by means of the classification,
wherein the common process number equals the remainder of five times a set common connection frame number plus a common subframe number, divided by a hybrid automatic repeat round trip time, and
wherein the common subframe number is subordinate to a common connection frame and is used to identify a different TTI.

2. The method according to claim 1, further comprising:
receiving the uplink data sent by the UE according to the classified result and the data scheduling type of the UE in the TDM TTI or the CDM TTI.

3. The method according to claim 1, after the sending, to a user equipment (UE), control information carrying the classified result, further comprising:
sending, to the UE, a grant command that is valid when the data scheduling type of the UE is the same as a TTI data scheduling type, wherein the TTI data scheduling type comprises the TDM TTI and the CDM TTI, so as to instruct the UE to send the uplink data according to the grant command, the classified result, and the data scheduling type of the UE in the TDM TTI or the CDM TTI; or
sending, to the UE, grant control information carrying indication information that is used to indicate whether the UE can transmit the uplink data in the CDM TTI or the TDM TTI, so as to instruct the UE to send the uplink data according to the grant control information, the classified result, and the data scheduling type of the UE in the TDM TTI or the CDM TTI.

4. A data transmission apparatus, comprising:
a signal processor, configured to classify, by using a transmission time interval (TTI) as a classification basis, TTIs on a carrier in a cell into a time division multiplexing (TDM) TTI and a code division multiplexing (CDM) TTI; and
a transceiver, configured to send, to a user equipment (UE) through an enhanced dedicated channel absolute grant channel, control information carrying a classified result, so as to instruct the UE to send uplink data according to the classified result and a data scheduling type of the UE in the TDM TTI or the CDM,
wherein the classified result comprises a common process number that is used to identify each TTI obtained by means of the classification, and a bit that is in a one-to-one correspondence with each common process number,
wherein different bits are respectively used to identify the TDM TTI and the CDM TTI that are obtained by means of the classification,
wherein the common process number equals the remainder of five times a set common connection frame number plus a common subframe number, divided by a hybrid automatic repeat round trip time, and
wherein the common subframe number is subordinate to a common connection frame and is used to identify a different TTI.

5. The apparatus according to claim 4, the transceiver is further configured to receive the uplink data sent by the UE according to the classified result and the data scheduling type of the UE in the TDM TTI or the CDM TTI.

6. The apparatus according to claim 4, wherein the transceiver is further configured to send, to the UE, a grant command that is valid when the data scheduling type of the UE is the same as a TTI data scheduling type, wherein the TTI data scheduling type comprises the TDM TTI and the CDM TTI, for instructing the UE to send the uplink data according to the grant command, the classified result, and the data scheduling type of the UE in the TDM TTI or the CDM TTI.

7. The apparatus according to claim 4, wherein the transceiver is further configured to send, to the UE, grant control information carrying indication information that is used to indicate whether the UE can transmit the uplink data in the CDM TTI or the TDM TTI, for instructing the UE to send the uplink data according to the grant control information, the classified result, and the data scheduling type of the UE in the TDM TTI or the CDM TTI.

8. A user equipment (UE), comprising a transceiver and a signal processor, wherein:
the transceiver is configured to receive control information that carries a classified result and is sent by a network side device through an enhanced dedicated channel absolute grant channel, wherein the classified result is a result that the network side device classifies, by using a transmission time interval (TTI) as a classification basis, a TTI comprised in a carrier in a cell into a time division multiplexing (TDM) TTI and a code division multiplexing (CDM) TTI; and receive the classified result and a data scheduling type of the user equipment that are determined by the signal processor, and send uplink data in the TDM TTI or the CDM TTI; and the signal processor is configured to determine, according to the control information sent by the transceiver, the classified result carried in the control information and the data scheduling type of the user equipment, wherein the classified result comprises a common process number that is used to identify each TTI obtained by means of the classification, and a bit that is in a one-to-one correspondence with each common process number, wherein different bits are respectively used to identify the TDM TTI and the CDM TTI that are obtained by means of the classification, wherein the common process number equals the remainder of five times a set common connection frame number plus a common subframe number, divided by a hybrid automatic repeat round trip time, and wherein the common subframe number is subordinate to a common connection frame and is used to identify a different TTI.

9. The UE according to claim 8, wherein the transceiver is further configured to receive a determined data scheduling type of the UE that is sent by the network side device; and the signal processor is specifically configured to send the uplink data according to the classified result carried in the control information and the received data scheduling type of the UE in the TDM TTI or the CDM TTI, wherein the control information is sent by the transceiver.

10. The UE according to claim 8, wherein the transceiver is further configured to receive a grant command that is valid when the data scheduling type of the UE is the same as a TTI data scheduling type, wherein the grant command is sent by the network side device, and the TTI data scheduling type comprises the TDM TTI and the CDM TTI; and the signal processor is specifically configured to send, when the data scheduling type of the UE is the same as the TTI data scheduling type, the uplink data according to the received grant command in the TDM TTI or the CDM TTI.

11. The UE according to claim 8, wherein the transceiver is further configured to receive grant control information that carries indication information that is used to indicate whether the UE can transmit the uplink data in the CDM TTI or the TDM TTI, wherein the grant control information is sent by the network side device; and the signal processor is specifically configured to send, when the data scheduling type of the UE is the same as a TTI data scheduling type and the grant control information allows the UE to send the uplink data, the uplink data according to the received grant control information in the TDM TTI or the CDM TTI.

* * * * *